US012717381B2

(12) United States Patent
Woodward et al.

(10) Patent No.: US 12,717,381 B2
(45) Date of Patent: Aug. 25, 2026

(54) DISCRETE OPTICAL PATHWAYS THROUGH SENSOR AND SENSOR COVER

(71) Applicant: Google LLC, Mountain View, CA (US)

(72) Inventors: Steven Thomas Woodward, Fremont, CA (US); Jens Mitchell Nielsen, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/867,318

(22) PCT Filed: May 19, 2023

(86) PCT No.: PCT/US2023/022879
§ 371 (c)(1), (2) Date: Nov. 19, 2024

(87) PCT Pub. No.: WO2023/225281
PCT Pub. Date: Nov. 23, 2023

(65) Prior Publication Data

US 2025/0216895 A1 Jul. 3, 2025

Related U.S. Application Data

(60) Provisional application No. 63/344,088, filed on May 20, 2022.

(51) Int. Cl.
*A61B 5/00* (2006.01)
*G06F 1/16* (2006.01)

(52) U.S. Cl.
CPC ............ *G06F 1/163* (2013.01); *G06F 1/1658* (2013.01); *G06F 1/1684* (2013.01)

(58) Field of Classification Search
CPC ......... A61B 5/00; A61B 5/024; A61B 5/1455; A61B 5/282; A61B 5/332; A61B 5/339;
(Continued)

(56) References Cited

U.S. PATENT DOCUMENTS 9,004,150 B2 4/2015 Naveau et al.
9,044,150 B2 6/2015 Brumback et al.
(Continued)

FOREIGN PATENT DOCUMENTS

CN 114466549 5/2022
WO WO 2021/253445 12/2021

OTHER PUBLICATIONS https://www.tec-science.com/material-science/structure-of-metals/crystallographic-defects/ (Year: 2018).*
(Continued)

*Primary Examiner* — Chanh D Nguyen
*Assistant Examiner* — Nguyen H Truong
(74) *Attorney, Agent, or Firm* — DORITY & MANNING P.A.

(57) ABSTRACT

The present disclosure provides a wearable device configured to selectively permit an emission and a reception of light. The wearable device includes a hub board, a sensor, a light blocking structure, and a sensor cover. The hub board includes an interior surface and an exterior surface. Further, the hub board extends longitudinally in an x-direction. The sensor is connected to the exterior surface of the hub board and includes a light emitter extending from the exterior surface of the hub board and a light receiver extending from the exterior surface of the hub board. The light blocking structure is located between the light emitter and the light receiver. Further, the light blocking structure extends transversely from the exterior surface of the hub board in a y-direction. The sensor cover is positioned over the sensor and includes an interior surface and an exterior surface. Further, the sensor cover includes a light allowing portion and a light blocking portion.

20 Claims, 7 Drawing Sheets

(58) Field of Classification Search

CPC ..... A61B 5/026; A61B 5/0295; A61B 5/0452; A61B 5/11; A61B 5/1172; A61B 5/0205; A61B 6/00; G04G 9/00; G04G 19/00; G04G 21/02; G04G 21/08; G01V 8/12; G01V 8/20; G06F 1/16; G06F 1/163; G06F 1/1658; G06F 1/1684; G06F 3/01; G06F 3/03; G06F 3/0484; G06T 11/20; G06T 13/00; G06V 20/20; A61L 31/02; H01L 25/16; H01L 31/0203; H01L 31/0216; H01L 31/173; H01L 31/02; H01L 31/16; H01L 31/0232; H01L 33/52; H01L 33/62; H05K 1/02; H05K 1/11; H05K 1/18; H05K 3/34; H05K 3/36; H05K 5/00; H05K 5/02; H05K 5/03; H02J 7/00; H02J 7/02; H02J 50/10; G04C 10/00; G01J 1/02; G01J 1/04; G01J 1/20; G01J 1/32; G01J 1/08; G01J 1/42; G04B 47/06; G01N 21/35; G01N 21/47; G01N 21/55; G06K 9/00; G01B 11/24

See application file for complete search history.

(56) References Cited

U.S. PATENT DOCUMENTS

| | | | | |
|---|---|---|---|---|
| 2008/0097221 | A1 | 4/2008 | Florian | |
| 2017/0251938 | A1 | 9/2017 | Ichikawa | |
| 2017/0315511 | A1* | 11/2017 | Shim | A61B 5/721 |
| 2018/0047830 | A1* | 2/2018 | Lu | H10K 59/126 |
| 2018/0196174 | A1* | 7/2018 | Vasylyev | G02B 1/04 |
| 2018/0360352 | A1* | 12/2018 | Ohno | A61B 5/1455 |
| 2020/0305794 | A1* | 10/2020 | Clavelle | A61B 5/02422 |
| 2022/0299360 | A1* | 9/2022 | Kurokawa | A61B 5/02427 |
| 2023/0058052 | A1* | 2/2023 | Al-Ali | A61B 5/02055 |
| 2023/0100047 | A1* | 3/2023 | Jones | G02B 1/02 359/601 |
| 2024/0313009 | A1* | 9/2024 | Watanabe | H10F 39/12 |
| 2024/0389901 | A1* | 11/2024 | Venugopal | A61L 31/028 |
| 2025/0025059 | A1* | 1/2025 | Li | A61B 5/681 |

OTHER PUBLICATIONS

International Preliminary Report on Patentability for PCT/US2023/022879, mailed on Dec. 5, 2024, 10 pages.

International Search Report and Written Opinion for PCT/US2023/022879, mailed on Sep. 15, 2023, 14 pages.

* cited by examiner

DISCRETE OPTICAL PATHWAYS THROUGH SENSOR AND SENSOR COVER

RELATED APPLICATIONS

The present application is based upon and claims the right of priority under 35 U.S.C. § 371 to International Application No. PCT/US2023/022879 having a filing date of May 19, 2023, which claims priority to and the benefit of U.S. Provisional Patent Application No. 63/344,088, having a filing date of May 20, 2022. Applicant claims priority to and the benefit of each of such applications and incorporates all such applications herein by reference in their entirety.

FIELD

The present disclosure relates generally to a wearable device configured to selectively permit an emission and a reception of light. More particularly, the present disclosure relates to a wearable device with a light blocking structure and a sensor cover with light allowing and light blocking portions configured to selectively permit an emission and reception of light and methods of manufacturing said wearable device.

BACKGROUND

Recent advances in technology, including those available through consumer devices, have provided for corresponding advances in health detection and monitoring. For example, wearable devices, such as fitness trackers and smart watches, are able to determine information relating to a person wearing the device or the environment surrounding the device. In addition, the wearable device is able to output a signal to the user based on either the input of the user, the configuration of the wearable device, or the environment surrounding the wearable device.

Such wearable devices may be worn by a user a provide a variety of functionality to a user that a traditional watch or jewelry may not be able to provide. One type of functionality that a wearable device can provide to a user is the acquisition of various types of data that may be used to help a user determine his or her state of health. Some of these types of data may include the typical vital signs such as heart rate, respiration rate, body temperature, or other physiologically relevant data such as blood pressure, oxygen saturation levels, blood glucose levels, or skin perspiration.

One specific way wearable devices accomplish the acquisition of vital signs or other physiologically relevant data is through the use of photoplethysmography (PPG). PPG is a non-invasive means of using light to detect signals such as heart rate, oxygen saturation levels, or blood pressure. More specifically, PPG achieves this by detecting changes in blood volume over a period of time. This detection is achieved through the use of an optical sensor which emits light into a user's skin to a blood vessel, where such light is then partially reflected back out of the user's skin into the optical sensor. The amount of light reflected back into the optical sensor is then used to determine the blood volume of the user at a specific time. The determined blood volume may then be used to determine other signals such as heart rate, oxygen saturation levels, or blood pressure.

One particular challenge designers of wearable devices with optical sensors configured for PPG have faced is that light emitted by the optical sensor may directly return to the optical sensor prior to entering the user's skin and lead to erroneous data being provided to the optical sensor.

Thus, it would be desirable to have a wearable device with a PPG optical sensor that is configured to selectively permit an emission and a reception of light. Further, it would be desirable to have a PPG optical sensor that reduces the amount of erroneous data obtained as a result of light being directly emitted and received by the optical sensor without entering a user's skin. Further, it would be desirable to have PPG optical sensors which are capable of providing more accurate data to a user.

Accordingly, the present invention is related to a wearable device configured to selectively permit an emission and a reception of light.

SUMMARY

Aspects and advantages of embodiments of the present disclosure will be set forth in part in the following description, or can be learned from the description, or can be learned through practice of the embodiments.

One example embodiment of the present disclosure is directed to a wearable device configured to selectively permit an emission and a reception of light. The wearable device may include a hub board, a sensor, a light blocking structure, and a sensor cover. The hub board may have an interior surface and an exterior surface where the hub board extends longitudinally in an x-direction. The sensor may be connected to the exterior surface of the hub board, and the sensor may include a light emitter and a light receiver. The light emitter may extend from the exterior surface of the hub board, and the light receiver may extend from the exterior surface of the hub board. The light blocking structure may be located between the light emitter and the light receiver. Further, the light blocking structure may extend transversely from the exterior surface of the hub board in a y-direction. The sensor cover may be positioned over the sensor and may have an interior surface and an exterior surface. Further, the sensor cover may include a light allowing portion and light blocking portion.

Another aspect of the present disclosure is directed to a wearable device where the light blocking portion includes a first light blocking portion and a second light blocking portion. The first light blocking portion may be located between the interior surface of the sensor cover and the exterior surface of the sensor cover. Further, the first light blocking portion may be generally perpendicular to the x-direction in which the hub board extends. The second light blocking portion may be located on the interior surface of the sensor cover. Further, the second light blocking portion may be generally parallel to the x-direction in which the hub board extends.

Another aspect of the present disclosure is directed to the wearable device where the first light blocking portion, the second light blocking portion, or both are formed through microdefects induced by laser radiation, thermal radiation, or a combination thereof.

Yet another aspect of the present disclosure is directed to the wearable device where the microdefects result from a transition change from an amorphous structure to a crystalline structure.

Still another aspect of the present disclosure is directed to the wearable device where the first light blocking portion, the second light blocking portion, or both are formed by reducing a level of transparency of the sensor cover located at the first light blocking portion or the second light blocking portion.

In a further aspect, the present disclosure is directed to the wearable device where the light blocking structure may be produced from ink, foam, an elastomer, a polymer, metal, or a combination thereof.

In yet a further aspect, the present disclosure is directed to the wearable device where the light emitter is a light emitting diode or an infrared laser.

In still a further aspect, the present disclosure is directed to the wearable device where the light receiver is a photodiode or a phototransistor.

In another aspect, the present disclosure is directed to the wearable device where the sensor cover has a height H1 in the y-direction and the first light blocking portion has a height H2 in the y-direction, wherein the height H2 is about 50% to about 100% of the height H1.

In yet another aspect, the present disclosure is directed to the wearable device the sensor cover has a width W1 in the x-direction and the first light blocking portion has a width W2 in the x-direction, wherein the width W2 is about 1% to about 99% of the width W1.

In still another aspect, the present disclosure is directed to the wearable device where the second light blocking portion has a width W3, wherein the width W3 is about 1% to about 99% of the width W1 or a range of about 1% to about 100% of the width W2.

In another further aspect, the present disclosure is directed to the wearable device where the light blocking portion is formed via removing material from the sensor cover.

In yet another further aspect, the present disclosure is directed to the wearable device where the light blocking portion includes at least one of a grouping of holes, a groove, a counterbore, or combinations thereof.

In still yet another further aspect, the present disclosure is directed to the wearable device where the light blocking portion comprises a counterbore having a major portion and a minor portion. Further, a material is disposed within the major portion of the counterbore.

In another embodiment, the present disclosure is directed to a method for manufacturing wearable devices configured to selectively permit an emission and a reception of light. In particular, the method may include placing a hub board having an interior surface and an exterior surface within the wearable device where the hub board may extend longitudinally in an x-direction. The method may further include connecting a sensor to the exterior surface of the hub board where the sensor may include a light emitter extending from the exterior surface of the hub board and a light receiver extending from the exterior surface of the hub board. The method may further include forming a light blocking structure between the light emitter and the light receiver where the light blocking structure may be extending transversely from the exterior surface of the hub board in a y-direction. The method may further include mounting a sensor cover over the sensor where the sensor cover may have an interior surface and an exterior surface. Further, the sensor cover may include a light allowing portion and a light blocking portion.

In yet another embodiment, the present disclosure is directed to a sensor hub configured to selectively permit an emission and a reception of light. In particular, the sensor hub may include a hub board, a sensor, a light blocking structure, and a sensor cover. The hub board may have an interior surface and an exterior surface where the hub board extends longitudinally in an x-direction. The sensor may be connected to the exterior surface of the hub board, and the sensor may include a light emitter and a light receiver. The light emitter may be extending from the exterior surface of the hub board, and the light receiver may be extending from the exterior surface of the hub board. The light blocking structure may be located between the light emitter and the light receiver. Further, the light blocking structure may be extending transversely from the exterior surface of the hub board in a y-direction. The sensor cover may be positioned over the sensor and may have an interior surface and an exterior surface. Further, the sensor cover may include a light allowing portion and a light blocking portion.

In another aspect, the present disclosure is directed to the sensor hub where the sensor includes a heart rate monitor, an oximeter, a blood pressure monitor, or a combination thereof. Further, in the same aspect, the light emitter outputs at least one of an optical light with a wavelength of about 620 to about 750 nanometers or an optical light with a wavelength of about 490 to about 570 nanometers.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
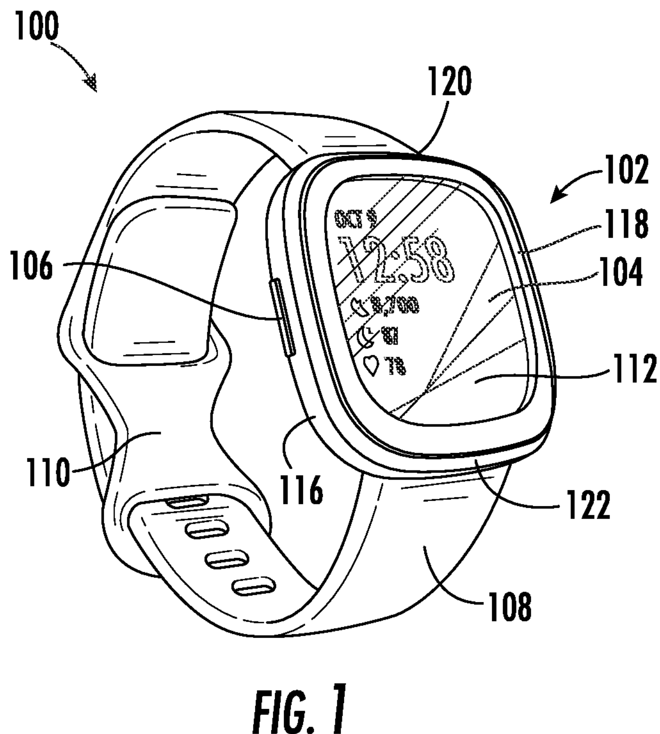
FIG. 1 provides a front, orthogonal view of a system comprising a wearable device according to the present disclosure.

Reference numerals that are repeated across plural figures are intended to identify the same features in various implementations.

DETAILED DESCRIPTION

Any of the features, components, or details of any of the arrangements or embodiments disclosed in this application, including without limitation any of the wearable device embodiments and any of the methods of manufacturing said wearable device disclosed below, are interchangeably combinable with any other features, components, or details of any of the arrangements or embodiments disclosed herein to form new arrangements and embodiments.

Generally, the present disclosure is related to a wearable device configured to selectively permit an emission and a reception of light. The wearable device may include a hub board, a sensor, a light blocking structure, and a sensor cover. The hub board may have an interior surface and an exterior surface where the hub board extends longitudinally in an x-direction. The sensor may be connected to the exterior surface of the hub board, and the sensor may include a light emitter and a light receiver. The light emitter may extend from the exterior surface of the hub board, and the light receiver may extend from the exterior surface of the hub board. The light blocking structure may be located between the light emitter and the light receiver. Further, the light blocking structure may extend transversely from the exterior surface of the hub board in a y-direction. The sensor cover may be positioned over the sensor and may have an interior surface and an exterior surface. Further, the sensor cover may include a light allowing portion, a first light blocking portion, and a second light blocking portion. The first light blocking portion may be located between the interior surface of the sensor cover and the exterior surface of the sensor cover. Further, the first light blocking portion may be generally perpendicular to the x-direction in which the hub board extends. The second light blocking portion may be located on the interior surface of the sensor cover. Further, the second light blocking portion may be generally parallel to the x-direction in which the hub board extends.

In particular, without intending to be limited by any particular theory, the wearable device's light blocking structure and sensor cover are capable preventing light from entering the light receiver before exiting and returning to the wearable device, which can prevent erroneous readings from being taken by a sensor. Because of the presence of the light blocking structure, light is prevented from either directly entering the light receiver or reflecting off the sensor cover and then entering the light receiver. By placing a cover with a first light blocking portion that is generally perpendicular to the light emitter or the light receiver in an x-direction, light may be focused to selectively exit the sensor cover and followed a desired path. Further, the first light blocking portion may also prevent light from internally reflecting inside the sensor cover and entering the light receiver before exiting and returning to the wearable device. In addition, by adding a second light blocking portion to the sensor cover that is generally parallel with the light emitter or the light receiver in the x-direction, light may be further prevented from internally reflecting inside the sensor cover and entering the light receiver before exiting and returning to the wearable device. One or more of each of these features result in a wearable device that is configured to selectively permit the emission and the reception of light such that accurate readings may be taken by the sensor and error due to the sensor may be minimized.

With reference now to the figures, example embodiments of the present disclosure will be discussed in further detail. First, the components of the wearable device will be discussed, followed by the means in which the emission and reception of light may be selectively permitted.

Figure 2:
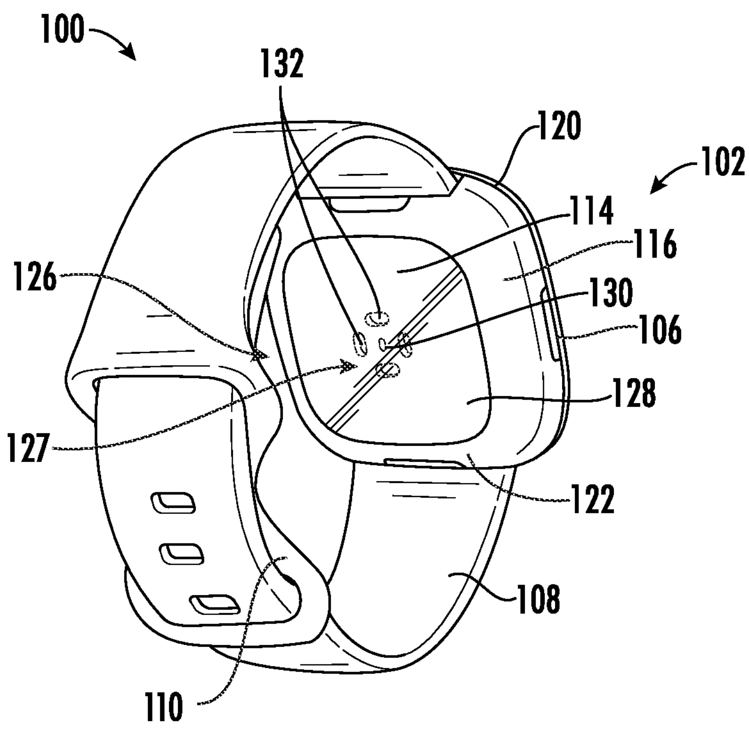
FIG. 2 provides a rear, orthogonal view of a system comprising a wearable device, particularly illustrating a sensor hub and sensor hub cover according to the present disclosure.
Figure 3:
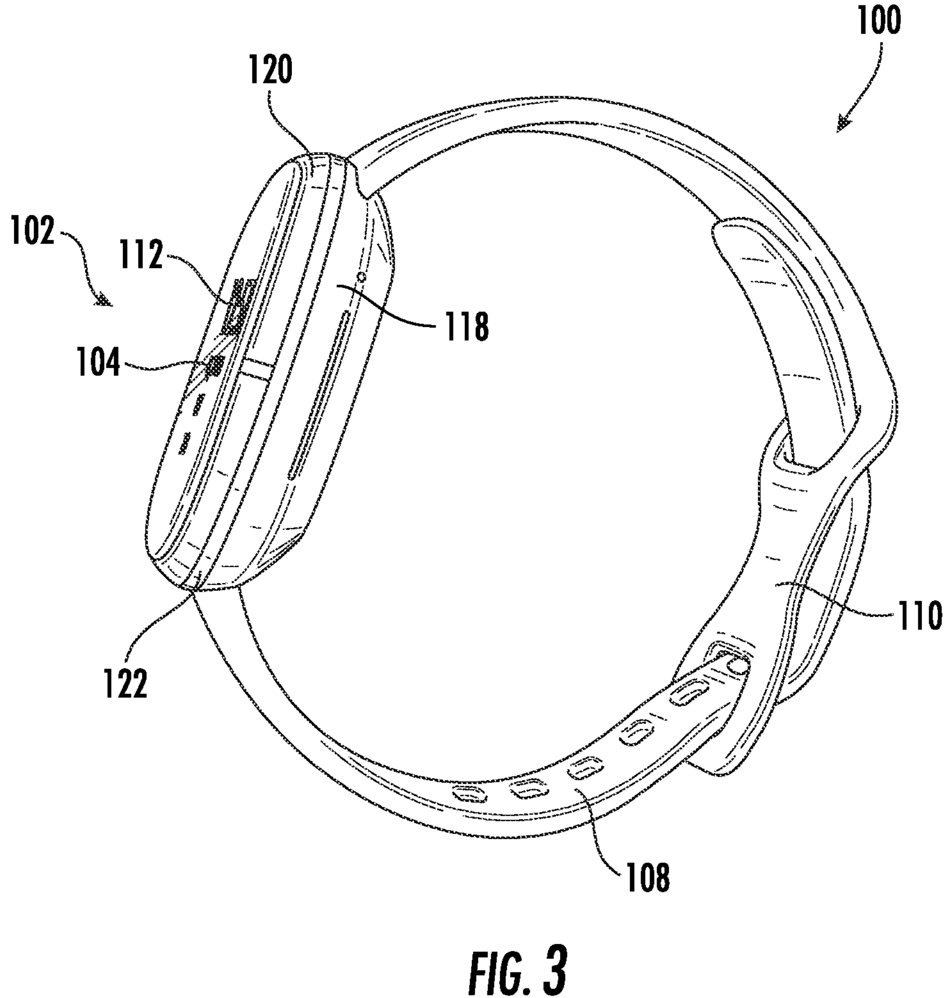
FIG. 3 provides a side view of a system comprising a wearable device according to the present disclosure.

FIGS. 1-3 show a wearable device according to one exemplary embodiment of the present disclosure. The wearable device 100 can be a wristwatch, smart watch, smart jewelry, fitness tracker, head mounted display, or any other type of device capable of being worn. The wearable device 100 may include a display 102, a display screen 104, a component port 106, an attachment means 108, and a securement means 110. Further, the wearable device 100 may include a front 112, a back 114, a first side 116, a second side 118, a top 120, and a bottom 122. Without intending to limit the present disclosure to a particular configuration, any two sides of the display 102 may be connected to the attachment means 108. The securement means 110 may be present on the attachment means 108. Further, the securement means 110 may be located opposite of the display 102 on an opposing end of the attachment means 108.

The display 102 may be capable of providing the wearer with a variety of information such as the time, the date, body signals, readings based upon user input, etc. Body signals may include, but are not limited to, heart rate, heart pressure, temperature, oxygen levels, or any other body signal that one of ordinary skill in the art would understand that can be measured by a wearable device 100. Readings based upon user input may include, but are not limited to, the number of steps a user has taken, the distance traveled by the user, the sleep schedule of the user, travel routes of the user, elevation climbed by the user, or any other metric that one of ordinary skill in the art would understand that can be inputted by a user into a wearable device 100. Further, either body signals or readings based upon user input may be used to calculate further analytics to provide to the user such as a fitness score, a sleep quality score, the number of calories a user has burned. Moreover, the wearable device 100 may also be capable of taking in outside input irrespective of the user such as ambient temperature in the environment, the amount of sun exposure the watch is subjected to, the atmospheric pressure of the environment, air quality of the environment, the location of the wearable device 100 based on a global positioning system (GPS), or other outside factors that one of ordinary skill in the art would understand a wearable device 100 would be capable of measuring.

Turning to the display screen 104, the display screen 104 may be capable of protecting the display 102 and any internal components from being damaged. In addition, the display screen 104 may be designed to and capable of achieving various other features. For example, the display screen 104 may be a liquid crystal display (LCD), a capacitive touch screen, a resistive touch screen, a protective glass, or combinations thereof. Further, the display screen 104 may be formed from a variety of materials. For example, the display screen 104 may be formed from a plastic, a glass, a glass composite, a metal, an alloy, a crystal, or combinations thereof.

Turning to the attachment means 108, the attachment means 108 may be capable of attaching the wearable device 100 to a user of said wearable device 100. The attachment means 108 may take the form of, but should not be construed as limited to, a strap, a rope, an elastic band, or any other form of attachment one of ordinary skill in the art would use to attach a wearable device 100 to a user of said wearable device 100.

Turning to the securement means 110, the securement means 110 may be capable of improving the attachment of the attachment means 108 upon the user. The securement means 110 may include, but should not be construed as limited to, a pin and hole locking mechanism, a magnet system, a lock, a clip, or any other type of securement that one of ordinary skill would consider. It should be noted that a securement means 110 may not be necessary for a wearable device 100 to be secured to a user. For example, a wearable device 100 may be secured to a user with a strap which is then tied around the user's wrist or other suitable appendage.

In addition to the aforementioned features, the wearable device 100 may also include a sensor hub 126. The sensor hub 126 may include a sensor 127 and a sensor cover 128. Like the display screen 104, the sensor cover 128 may be composed of a variety of materials. For example, the sensor cover 128 may be formed from a plastic, a glass, a glass composite, a metal, an alloy, a crystal, or combinations thereof. The sensor 127 may further include a light emitter 130 and a light receiver 132. The light emitter 130 may be configured to emit light generally or in a specific direction. The light emitter 130 may be a variety of devices or systems capable of emitting light. For example, the light emitter 130 may be a light emitting diode (LED), an infrared laser, or combinations thereof. Similar to the light emitter 130, the light receiver 132 may be configured to receive light generally or in a specific direction. The light receiver 132 may be a variety of devices or systems capable of receiving light. For example, the light receiver 132 may be a photodiode, a phototransistor, or combinations thereof.

Figure 4:
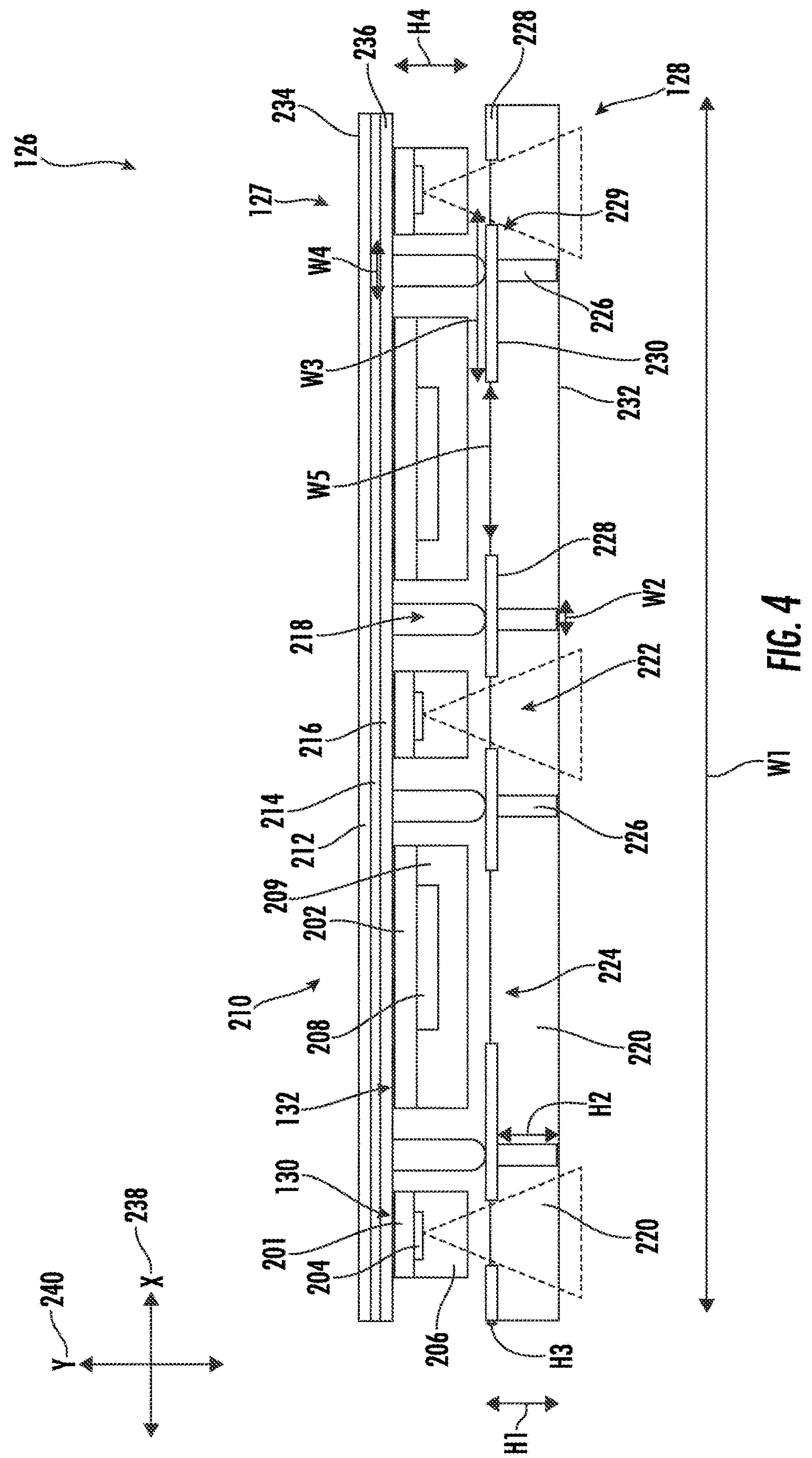
FIG. 4 illustrates a cross-sectional view of the wearable device of FIG. 2, particularly illustrating the sensor hub and sensor hub cover.

FIG. 4 illustrates a cross-sectional view of the wearable device of FIG. 2, particularly illustrating the sensor hub and sensor hub cover. However, it should be understood that the sensor 127 and sensor cover 128 may be utilized in a variety of other devices. For example, the sensor 127 and sensor cover 128 may be utilized in electronic devices generally, or more particularly, the wearable device 100 (as shown in FIGS. 1-3), a laptop, a computer, or other suitable equipment. Referring now to the sensor hub 126, the sensor hub 126 may include the sensor 127 and the sensor cover 128 as stated previously. The sensor hub 126 may further include a hub board 210 and a light blocking structure 218. The sensor hub 126 may be found in an x-direction 238 and a y-direction 240. The sensor cover 128 may have an interior surface 230 and an exterior surface 232. The hub board 210 may also have an interior surface 234 and an exterior surface 236. Without intending to be limiting to any configuration, the interior surfaces 230, 234 and exterior surfaces 232, 236 may be interior and exterior in reference to the wearable device 100.

Referring now to the sensor 127, the sensor 127 may be connected to an exterior surface 236 of the hub board 210. The sensor 127 may include a variety of diagnostic tools. For example, the sensor 127 may include or be a heart rate monitor, an oximeter, a blood pressure monitor, or a combination thereof. As stated previously, the sensor 127 may include a light emitter 130 and a light receiver 132. The light emitter may be configured to output a variety of types of electromagnetic radiation depending on the desired functionality of the sensor 127. Some types of electromagnetic radiation that may be used may be infrared, near-infrared light, optical light, ultraviolet, x-rays, gamma rays, or radio waves.

One desirable functionality of the sensor 127 may be photoplethysmography (PPG). PPG is a technique in which electromagnetic radiation in the form of optical light, near-infrared light, or infrared may be utilized to determine signals such as heart rate, oxygen saturation levels, or blood pressure by detecting changes in blood volume over a period of time. This detection of changes of blood volume over a period of time may be achieved by light being emitted or output by the light emitter 204 in a direction towards a user's body part (e.g., a portion of a user's wrist or other suitable part). This emitted light then interacts with blood vessels within the user's body part. In interacting with the user's body part, the emitted light is modified to a degree that is influenced by the current blood volume in the user's blood vessels. The modified light then returns back towards the sensor 127 via reflection or refraction and received within the light receiver 208. The wearable device 100 then processes the difference between the emitted light and the modified light to calculate the changes in blood volume over a period of time. The changes in blood volume over a period of time are then used to calculate signals such as heart rate, oxygen saturation, or blood pressure.

When the desired functionality is a sensor 127 capable of performing PPG, it may be useful to utilize optical light. In particular, optical light having a wavelength corresponding to red optical light, green optical light, or blue optical light may be particularly useful. More specifically, red optical light may be desirable to use in a sensor 127 configured for PPG because it is capable of penetrating deep within a prospective user's body and acquiring more biologically significant data. Red optical light is more capable of penetrating a user's body as a result of red light not being as readily absorbable by a user's body or blood vessels. In addition, if the sensor 127 configured for PPG is incorporated on a wearable device 100 worn by a user, red optical light may be capable of mitigating differences in pigmentation or skin color that would otherwise block the penetration of optical light having different wavelengths then red optical light. If red optical light is chosen, the specific wavelength may be at least one of an optical light with a wavelength of about 620 to about 750 nanometers, such as about 638 to about 725 nanometers, such as about 650 to about 710 nanometers, such as 670 to about 700 nanometers.

Green optical light may be desirable to use in a sensor configured for PPG because green light is more readily absorbable by a user's body and blood vessels in as a result of the blood vessels being red, and thus more prone to absorbing other wavelengths of light, such as green light. With the increased absorbability of green light, green light is less likely to be affected by ambient light surrounding the sensor 127. In addition, when using green light, motion may have a reduced impact on the sensors as a result of green light's absorbability by a user's body or blood vessels. If green optical light is chosen, the specific wavelength may be at least one of an optical light with a wavelength of about 490 to about 570 nanometers, such as about 512 to about 560 nanometers, such as about 520 to about 550 nanometers, such as 532 to about 540 nanometers.

Blue optical light may be desirable to use in a sensor configured for PPG for similar reasons as green optical light in that blue light is readily absorbable by a user's body and blood vessels. However, blue optical light may be even more readily absorbable by a user's body and blood vessels when compared to green optical light. If blue optical light is chosen, the specific wavelength may be at least one of an optical light with a wavelength of about 360 to about 488 nanometers, such as about 380 to about 488 nanometers, such as about 390 to about 458 nanometers, such as 400 to about 442 nanometers.

The light emitter 130 may extend from the exterior surface 236 of the hub board 210 and may include a component board 201 and a light focuser 206. The light receiver 132 may also extend from the exterior surface 236 of the hub board 210 and may also include a component board 202 and a light focuser 209. The light focusers 206, 209 may help assist in directing the light toward a general pathway. For example, the light emitter focuser 206 may help direct a pathway for light emission 222 and, the light receiver focuser 209 may help direct a pathway for light reception 224. Examples of systems that may be used as the light focusers 206, 209 are lenses, mirrors, prisms, glass, or other means suitable for focusing or directing light in a particular direction.

Now referring to the light blocking structure 218 of the sensor hub 126, shown in detail in FIG. 4, the light blocking structure 218 may be located between the light emitter 130 and the light receiver 132. Further, the light blocking structure 218 may extend transversely from the exterior surface 236 of the hub board 210 in a y-direction 240. Further still, the light blocking structure 218 may extend from the exterior surface 236 of the hub board 210 to the interior surface 230 of the sensor cover 128. By providing a light blocking structure 218 between the light emitter 130 and the light receiver 132, light may be prevented from directly traveling from the light emitter 130 to the light receiver 132. In addition, if the light blocking structure 218 extends from the exterior surface 236 of the hub board 210 to the interior surface 230 of the sensor cover 128, light may be further prevented or entirely prevented from traveling from the light emitter 130 to the light receiver 132.

Furthermore, the light blocking structure 218 may have a width W4. For example, the width W4 may range from about 0.025 millimeters (mm) to about 1.25 mm, such as from about 0.05 mm to about 1.0 mm, such as from about 0.075 mm to about 0.75 mm. By having a width W4, light may be prevented from passing through the light blocking structure 218 and directly entering the light receiver 208. The light blocking structure 218 may also have a height H4. For example, the height H4 may range from about 0.6 mm to about 4.5 mm, such as from about 0.015 mm to about 5.5 mm, such as from about 0.03 mm to about 5.0 mm, such as from about 0.05 mm to about 4.75 mm. By having a height H4, light may be prevented from passing over the light blocking structure 218 and entering the light receiver 208 without exiting the confines of the sensor hub 126 or even entering the sensor cover 128.

The light blocking structure 218 may be integrally formed with the exterior surface 236 of the hub board 210 or the light blocking structure 218 may be attached separately to the exterior surface 236 of the hub board 210. For example, if the light blocking structure 218 is to be attached separately to exterior surface 236 of the hub board 210, the light blocking structure 218 may be attached via an adhesive, a solder, a weld, a thermal treatment, a chemical treatment, or other suitable means. In addition, the light blocking structure 218 may be formed from a variety of materials. For example, if the light blocking structure 218 is integrally formed with the exterior surface 236 hub board 210, then the light blocking structure 218 may be formed from the same materials as the exterior surface 236 of the hub board 210 or vice versa. Alternatively, if the light blocking structure 218 is to be attached separately to the exterior surface 236 of the hub board 210, the light blocking structure 218 may be formed from differing materials from the exterior surface 236 of the hub board 210. However, it should be understood that the light blocking structure 218 may also be formed as the same materials as the exterior surface 236 of the hub board 210 and attached separately thereto as well. In some embodiments, the light blocking structure 218 may be formed from an elastomer (such as a rubber), a foam, a metal, a metal coating, a polymer, a ceramic, an alloy, a composite, or any other suitable materials or combinations. In addition, the light blocking structure 218 may be an implement, such as a gasket positioned around the light emitter 130 and the light receiver 132, respectively.

Referring now to the hub board 210, the hub board 210 may extend longitudinally in an x-direction 238. In addition, the hub board 210 may include a first stiffener 212, an adhesive layer 214, and a second stiffener 216. The adhesive layer 214 may be disposed between and can join the first stiffener 212 to the second stiffener 216. The stiffeners 212, 216 may be composed of an epoxy, a polyimide, or a metal such as aluminum or stainless steel. Further, the stiffeners 212, 216 may have a thickness ranging from about 0.025 mm to about 0.75 mm, such as from about 0.05 mm to about 0.5 mm, such as from about 0.075 mm to 0.45 mm. The adhesive layer 214 may include a film that can be formed from polyethylene, chlorotrifluoroethylene, fluorinated ethylene propylene, or polytetrafluoroethylene. Further, the adhesive layer 214 may have a thickness ranging from about 10 micrometers (μm) to 400 μm, such as from about 25 μm to 375 μm, such as about 50 μm to 350 μm, such as about 75 μm to 325 μm.

Now referring to the sensor cover 128, the sensor cover 128 may be positioned over the sensor 127. As stated previously, the sensor cover 128 may have an interior surface 230 and an exterior surface 232. The sensor cover 128 may also have a width W1 in an x-direction 238. The width W1 of the sensor cover may be sufficient to cover the sensor 127 and the sensor hub 126 and may range from about 3 mm to about 18 mm, such as from about 5 mm to about 16 mm, such as from about 5 mm to about 14.5 mm. The sensor cover 128 may also have a height H1 in a y-direction 240 ranging from about 0.025 mm to about 2.5 mm, such as from about 0.05 mm to about 2.25 mm, such as from about 0.075 mm to about 2.0 mm. By having a sensor cover 128 having a height H1 in a y-direction, the sensor cover 128 may be capable of altering the pathway that light travels from the light emitter 204 out toward an external environment or toward a user's body. For example, the height H1 may allow for the sensor cover 128 to reduce the intensity of light that exits the sensor cover 128 when being emitted from the light emitter 204 and through the sensor cover 128. Further, the height H1 may help mitigate the possibility of light reflecting within the sensor cover 128 and travelling directly to the light receiver 208 without exiting the confines of the sensor hub 126 or the sensor cover 128.

The sensor cover 128 may include a light allowing portion 220, a first light blocking portion 226, and a second light blocking portion 228. The light allowing portion 220 may be an area or region of the sensor cover 128 where the pass through of light is designed for and particularly desirable. For example, if the sensor cover 128 is formed from a transparent material, the light allowing portion 220 may be formed by abstaining from processing the particular region of the sensor cover 128 where the pass through of light is desired. As described, the term "transparent" refers to a material which allows the pass through of light. Particularly, the pass through of light may be without appreciable or substantial scattering of the light.

Turning to the first light blocking portion 226, the first light blocking portion may be located between the interior surface 230 of the sensor cover 128 and the exterior surface 232 of the sensor cover 128. In addition, the first light blocking portion 226 may be generally perpendicular to the x-direction 238 in which the hub board 210 extends. By having a sensor cover 128 with a first light blocking portion 226 with the aforementioned features, the sensor cover 128 may be capable of preventing light that is internally reflected within the sensor cover 128 from travelling directly from the light emitter 204 to the light receiver 208 without escaping the confines of the sensor hub 126 or the sensor cover 128.

To this end, the first light blocking portion 226 may have a width W2 in an x-direction 238. The width W2 may range from about 0.0025 to about 2.5 mm, such as about 0.005 to about 2.25 mm, such as about 0.0075 to about 2.0 mm. In addition, the width W2 may share a direct relationship with the width W1 of the sensor cover 128. For example, the width W2 may range from about 1% to about 99% of the width W1, such as about 5% to about 80%, such as about 10% to about 60%, such as about 20% to about 50%. By having a width W2, light may be prevented from passing through the first light blocking portion 226 and directly entering the light receiver 208.

The first light blocking portion 226 may also have a height H2 in a y-direction 240. The height H2 may range from about 0.0025 mm to about 2.5 mm, such as from about 0.005 mm to about 2.25 mm, such as from about 0.0075 mm to about 2.0 mm. In addition, the height H2 of the first light blocking portion 226 may share a direct relationship with the height H1 of the sensor cover 128. For example, the height H2 may be from about 50% to about 100% of the height H1, such as from about 60% to about 100% of the height H1, such as from about 70% to about 100% of the height H1, such as from about 80% to about 100% of the height H1, such as from about 90% to about 100% of the height H1, such as from about 99% to about 100% of the height H1. Moreover, in a particular embodiment, the height H2 of the first light blocking portion 226 may be approximately the same as the height H1 or about 100% of the height H1 of the sensor cover 128. By having the height H2 be approximately the same as the height H1 of the sensor cover, light may be prevented from passing under or over the first light blocking portion 226 and entering the light receiver 208 without exiting the confines over the sensor hub 126 or sensor cover 128. Alternatively, in another embodiment, height H2 of the first light blocking portion 226 may be less than the height H1 or less than 100% of the height H1 of the sensor cover 128. By having the height H2 be less than the height H1, it may reduce the degree of difficulty in manufacturing the first light blocking portion 226.

Referring now to the second light blocking portion 228, the second light blocking portion 228 may be located on the interior surface 230 of the sensor cover 128 and be generally parallel to the x-direction 238 in which the hub board 210 extends. By forming a second light blocking portion 228 in the sensor cover, light may be further prevented from travelling directly from the light emitter 130 to the light receiver 132 without exiting the confines of the sensor hub 126 or the sensor cover 128 than if only the first light blocking portion was used alone. However, it should be understood that the second light blocking portion 228 may also be used alone without forming the first light blocking portion 226 and still be capable of selecting permitting an emission or reception of light. Like the first light blocking portion 226, the second light blocking portion 228 may have a width W3 and a height H3. For example, the width W3 of the second light blocking portion 228 may range from about 0.0025 mm to about 2.5 mm, such as from about 0.005 mm to about 2.25 mm, such as about 0.0075 mm to about 2.0 mm. In addition, the width W3 may have a direct relationship with either the width W1 of the sensor cover 128 or the width W2 of the first light blocking portion 226. For example, the width W3 may range from about 1% to about 99% of the width W1, such as about 5% to about 80% of the width W1, such as about 10% to about 60% of the width W1, such as about 20% to about 50% of the width W1, and/or the width W3 may range from about 100% to about 1000% of the width W2, such as about such as about 200% to about 800% of the width W2, such as about 300% to about 600% of the width W2, such as about 400% to about 500% of the width W2. However, it may be possible that a second light blocking portion 228 is not utilized or the width W2 of the first light blocking portion 226 exceeds the width W3 of the second light blocking portion 228. In this alternative example, the width W3 may range from about 1% to about 100% of the width W2, such as about such as about 5% to about 80% of the width W2, such as about 10% to about 60% of the width W2, such as about 20% to about 50% of the width W2. By having a width W3 for the second light blocking portion 228 as described the second light blocking portion may be able to create a window in which light can pass through such that light is directed in a particularly desirable manner.

One possible result of choosing the width W3 of the second light blocking portion 228 is that the width W5 of the light allowing portion 220 will be formed in an x-direction 238 as well. For example, if the width W3 of the second light blocking portion is about 20% of the width W1 of the sensor cover 128, then the width W5 of the light allowing portion 220 can be about 80% of the width W1 of the sensor cover. However, if a second light blocking portion 228 is not utilized or the width W2 of the first light blocking portion 226 exceeds the width W3 of the second light blocking portion 228, then the width W5 of the light allowing portion may instead be dependent on the first light blocking portion 226. For example, if the first light blocking portion 226 has a width W2 ranging from about 20% of the width W1 of the sensor cover 128, then the width W5 of the light allowing portion can be about 80% of the width W1 of the sensor cover 128.

The first light blocking portion 226 and the second light blocking portion 228 may be formed to block light through a variety of methods. One particular method is a laser may be utilized to emit laser radiation capable of introducing microdefects into localized portions of the sensor cover 128 chosen to be the light blocking portions 226, 228. However, it should be understood that a laser may not be the only device capable of introducing these microdefects. For example, the microdefects may be introduced via thermal radiation or a combination of laser and thermal radiation. These microdefects may be capable of either reflecting or refracting the light away from the light blocking portions 226, 228 or otherwise impeding light from passing through the light blocking portions 226, 228.

Another particular method of creating the light blocking portions 226, 228 is through using laser or thermal radiation or a combination thereof to transition the internal structure of the localized portions chosen to be the light blocking portions 226, 228 from an amorphous structure to a crystalline structure. A crystalline structure typically includes a more tightly packed set of atoms or molecules which enables the crystalline structure to be more suited to blocking the passage of light through the light blocking portions 226, 228 than an amorphous structure which typically includes less lightly packed atoms or molecules.

Still another method of creating the light blocking portions 226, 228 is through using laser or thermal radiation or a combination thereof to reduce a level of transparency of the localized portions chosen to be the light blocking portions 226, 228. For example, the light blocking portions 226, 228 may be formed through a transition of localized portions of the sensor cover 128 from either transparent to translucent or translucent to opaque or transparent to opaque. By reducing the transparency of the light blocking portions 226, 228, the ability of light to pass through the light blocking portions 226, 228 may be reduced. As described, the term "opaque" refers to a material that does not allow light to pass through, while the term "translucent" refers to a material which allows light to pass through but with some scattering of the light passing through.

Still another method of creating the light blocking portions 226, 228 is through ultraviolet (UV) radiation. For example, the sensor cover 128 may be processed prior to forming the light blocking portions 226, 228 in such a manner that the light blocking portions 226, 228 will be altered when UV radiation is applied to the light blocking portions 226, 228. Once the UV radiation is applied, the light blocking portions 226, 228 may then transition from a light allowing state to a light blocking state and be capable of blocking the passage of light. This method may also be accomplished using laser radiation or thermal radiation as well.

An alternative form of creating the light blocking portions 226, 228 is through depositing a material where the light blocking portions 226, 228 are to be located. For example, a material may be deposited where the light blocking portions 226, 228 are to be located. The material may be a deposition or coating of an ink, a foam, an elastomer, a metal, a ceramic, or a plastic.

Still another means of creating either of the light blocking portions 226, 228 is through the removal of material. For example, when the sensor cover 128 is utilized, material may be removed from the sensor cover 128 at a region corresponding to the light blocking portions 226, 228. By removing the material at these particular regions, a differential between the refractive index of the material used in the sensor cover 128 and the air pocket corresponding to either of the light blocking portions 226, 228 may then be created. This differential may then be capable of causing a beam of light to either internally reflect within the glass or refract away from the light emitter 204 or the light receiver 208.

In another embodiment, the light blocking structure 218 and the second light blocking portion 228 may be formed together to form a light blocking region 229. In such embodiments, the light blocking region 229 may be formed of similar materials, such as a foam, a rubber, a metal, or combinations thereof. Further, the first light blocking portion 228 may also be formed together with the light blocking structure 218 and the second light blocking portion 228 to form the light blocking region 229.

In another embodiment, the light allowing portion 220 may be formed into the light blocking structure 218 and the light blocking portions 226, 228. For example, the light blocking structure 218 and the light blocking portions 226, 228 may be constructed of a material capable of preventing the passage of light, such as an opaque or translucent material, and positioned over the light emitter 204 and the light receiver 208. Next, an opening may be formed in the light blocking structure and the light blocking portions 226, 228 thereby forming a light allowing portion 220. The processing may cease there, or alternatively, a material capable of allowing the passage of light, such as a transparent material, may be disposed into the light allowing portion 220. The transparent material here may be one of a glass, a plastic, a composite, or any other suitable transparent material.

Figure 5:
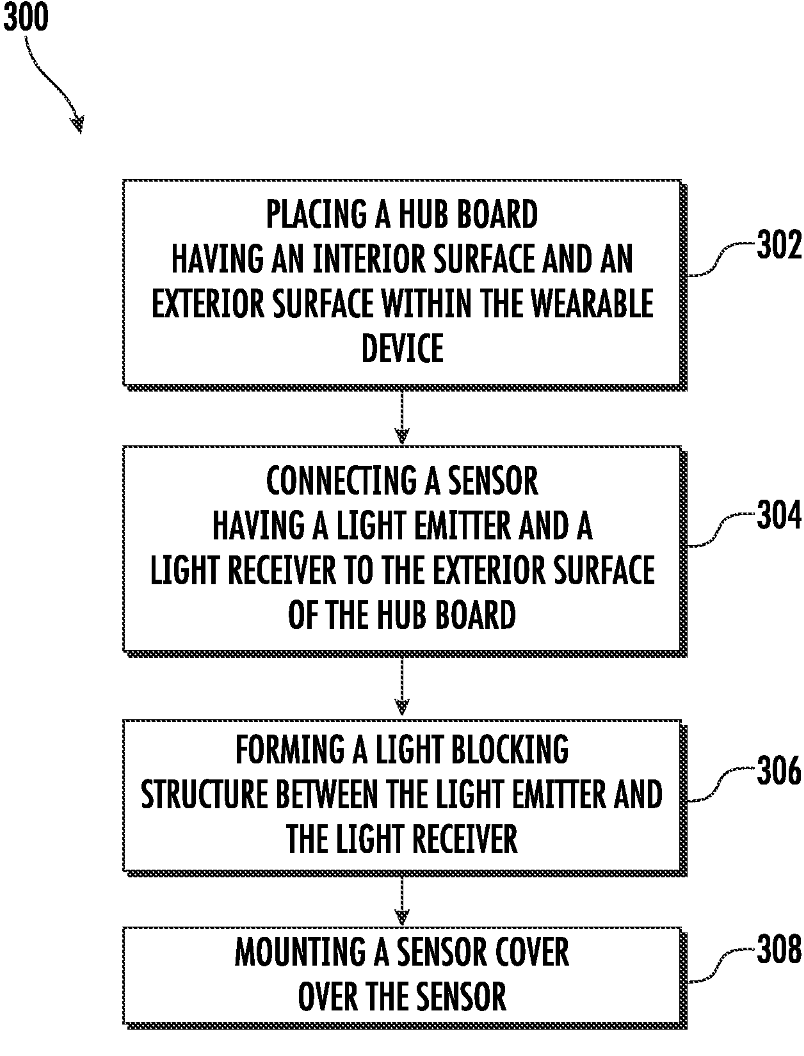
FIG. 5 illustrates a flow chart illustrating a method of manufacturing the wearable device of FIGS. 1-4, according to the present disclosure.

FIG. 5 illustrates a flow chart illustrating a method of manufacturing the wearable device of FIGS. 1-3 including a sensor hub of FIG. 4. The method 300 includes step 302, which involves placing a hub board having an interior surface and an exterior surface within the wearable device. Step 304 involves connecting a sensor having a light emitter and a light receiver to the exterior surface of the hub board. Step 306 involves forming a light blocking structure between the light emitter and the light receiver. Step 308 involves mounting a sensor cover over the sensor. The method 300 can include any additional steps that would be understood by one of ordinary skill in the art to manufacture a wearable device capable of evacuating fluids as described in detail above.

Figure 6A:
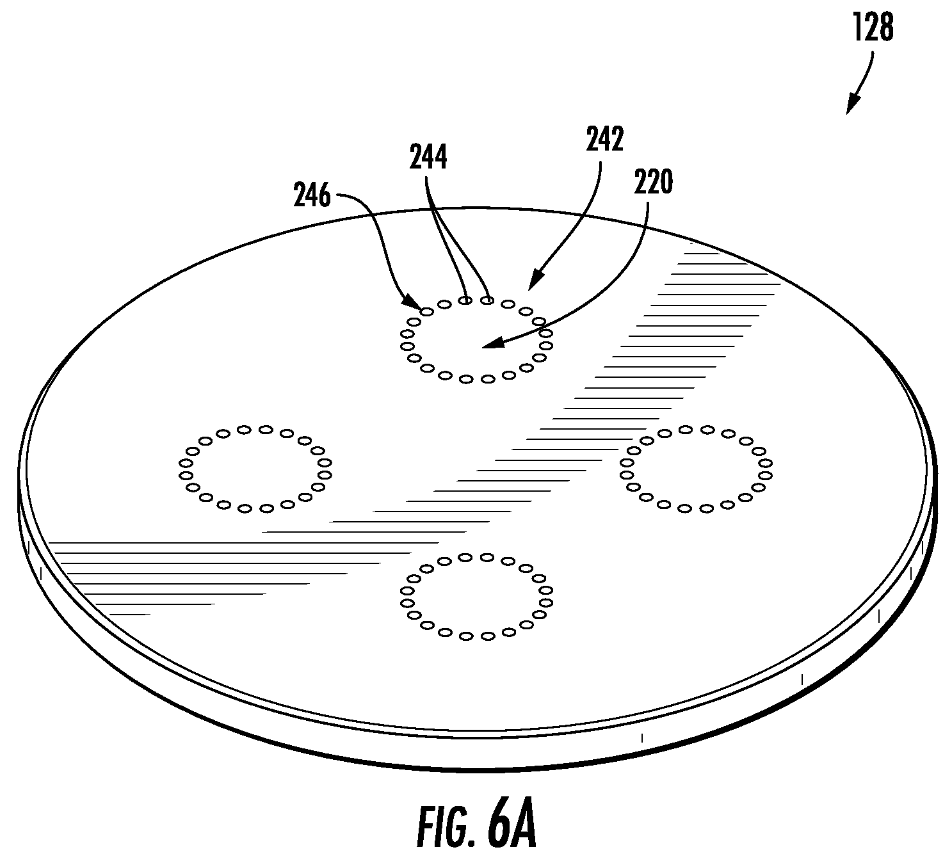
FIGS. 6*a*-6*b* illustrate various view of an embodiment of a sensor cover of a wearable device, particularly illustrating an additional embodiment of a configuration for a light blocking portion of the sensor hub cover according to the present disclosure.
Figure 6B:
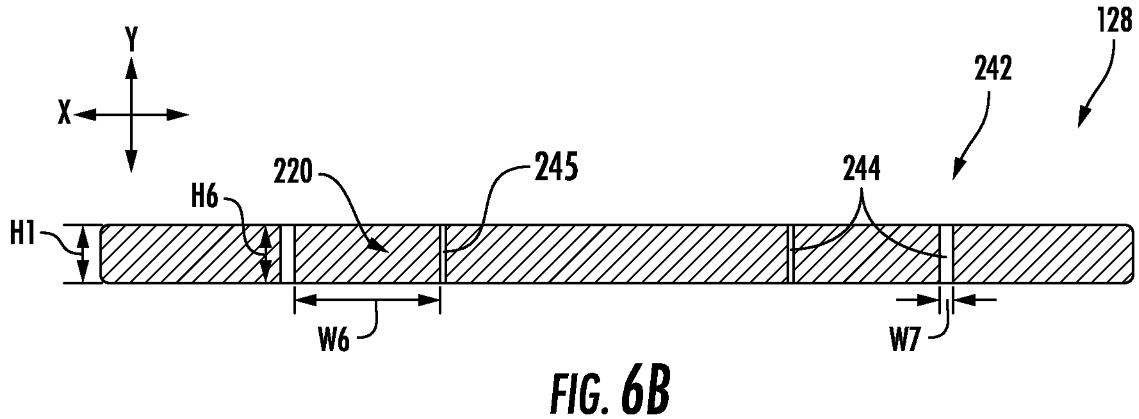

FIGS. 6*a*-6*b*, 7*a*-7*b*, and 8*a*-8*b* illustrate additional embodiments of a sensor cover of a wearable device, such as the wearable device 100. Specifically, each of the embodiments depicted in FIGS. 6*a*-8*b* may be formed via removing material from the sensor cover 128. As shown in FIGS. 6*a*-6*b*, the sensor cover 128 may include one or more of a plurality of light blocking portions 242. Specifically, the plurality of light blocking portions 242 may include a grouping of holes 244 having walls 245 configured in a continuous shape 246 on the sensor cover 128. For example, the continuous shape 246 of holes 244 may be a circle, a rectangle, a triangle, or any other shape of holes 244. The continuous shape 246 of the holes 244 may be positioned such that the light allowing region 220 is defined. Thus, by forming the grouping of holes 244 on the sensor cover 128, the light allowing region 220 may be formed. In particular, because material is removed from the sensor cover 128, the empty space that the holes 244 define may have a different refractive index than the regions of the sensor cover 128 that have material. As a result of this different refractive index, light may either bounce back or refract in a direction away from the light allowing region 220 when the light hits the holes 244 when travelling outward from the sensor cover 128. As a consequence, light is prevented from travelling directly from the light emitter 204 to the light receiver 208 as described above. In addition, a coating may be applied to the walls 245 of the holes 244 to further prevent light from travelling in an undesirable manner through the holes 244. For example, the coating may include an ink, a foam, an elastomer, a metal, a ceramic, or a plastic.

Further, to control the selective light blocking properties, one respective hole 244 may be spaced apart from another respective hole at a maximum width W6. For example, the width W6 may range from about 1 mm to about 3 mm, such as about 1.5 mm to about 2.5 mm, such as about 2 mm to about 2.25 mm. By providing a maximum width W6 between the holes 244, the size of the light allowing region 220 may be controlled such that light selectively passes through the sensor cover 128. To further control the selective light blocking properties of the sensor cover 128, the holes 244 may each have a defined width W7 and/or a defined height H6. The width W7 of an individual hole 244 may range from about 0.05 mm to about 0.5 mm, such as 0.1 mm to about 0.4 mm, such as about 0.15 mm to about 0.3 mm. Turning to the height H6, the height H6 of an individual hole 244 or all of the holes 244 may share a proportional relationship with the height H1 of the sensor cover 128. Specifically, the height H6 may range from about 10% to about 100% of the height H1, such as about 25% to about 85%, such as about 50% to about 70%. Thus, it can be understood that an individual hole 244 or all of the holes 244 may span the entirety of the height H1 of the sensor cover 128 or only a portion of the height H1 of the sensor cover 128.

Figure 7A:
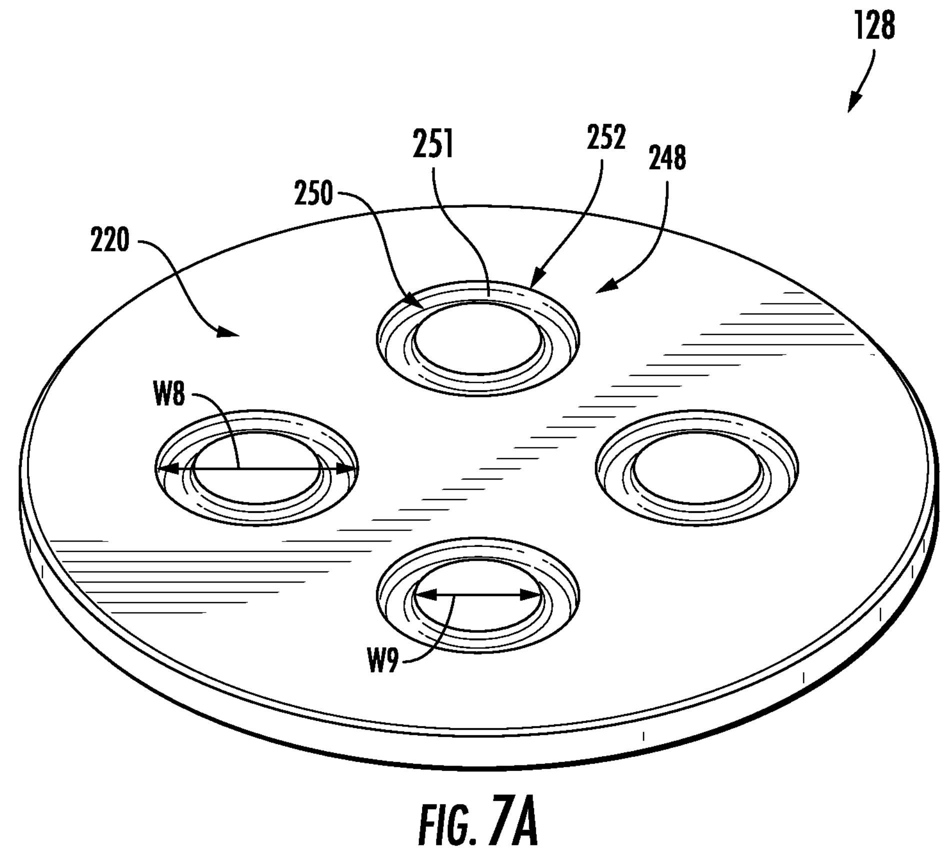
FIGS. 7*a*-7*b* illustrate various view of an embodiment of a sensor cover of a wearable device, particularly illustrating another embodiment of a configuration for a light blocking portion according to the present disclosure.
Figure 7B:
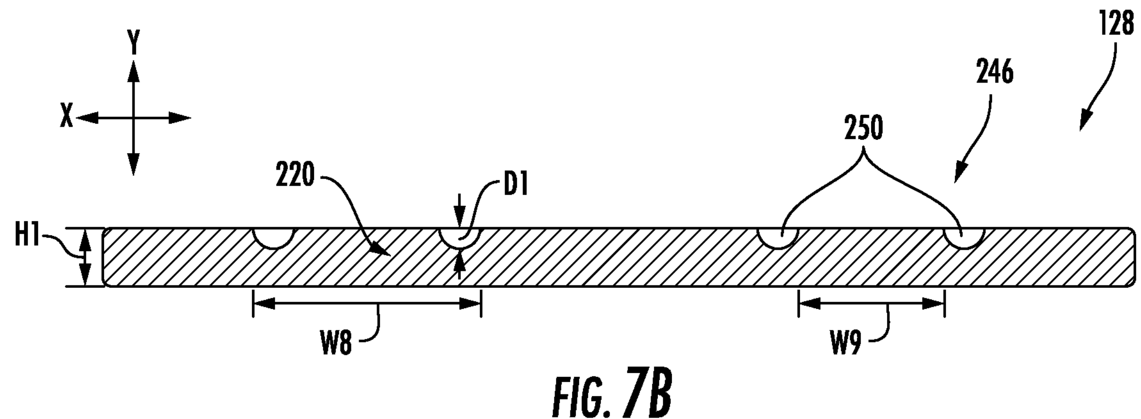

Referring now to FIGS. 7*a*-7*b*, one or more light blocking portions 248 may be defined on the sensor cover 128. Specifically, the light blocking portion 248 may include a groove or recess 250 having a wall 251 defined on the sensor cover 128. For example, the groove 250 may be in the form of a continuous or discontinuous shape 252 similar to the shape 246 described above. The grooves 250 may prevent the undesired pass through of light similar to how the holes 244 prevent the undesired pass through of light. Further, like the walls 245 of the holes 244, the wall 251 of the groove 250 may include a coating of an ink, a foam, an elastomer, a metal, a ceramic, or a plastic to further prevent light from passing through.

The groove 250 may have a defined outer width W8 and a defined inner width W9. The outer width W8 may range from about 1 mm to about 6 mm, such as about 1.5 mm to about 5 mm, such as about 2 mm to about 4 mm, such as about 2.5 mm to about 3 mm. The inner width W9 may range from about 0.5 mm to about 5 mm, such as about 1 mm to about 4 mm, such as about 1.5 mm to about 3 mm, such as about 2 mm to about 2.5 mm. Further, the groove 250 may have a defined depth D1. The depth D1 may range from about 0.1 mm to about 0.6 mm, such as about 0.2 mm to about 0.5 mm, such as about 0.3 mm to about 0.4 mm. By providing a groove 250 with a defined outer width W8, a defined inner W9, and a defined depth D1, the selective light blocking properties of the sensor cover 128 may be further controlled as detailed above.

Figure 8A:
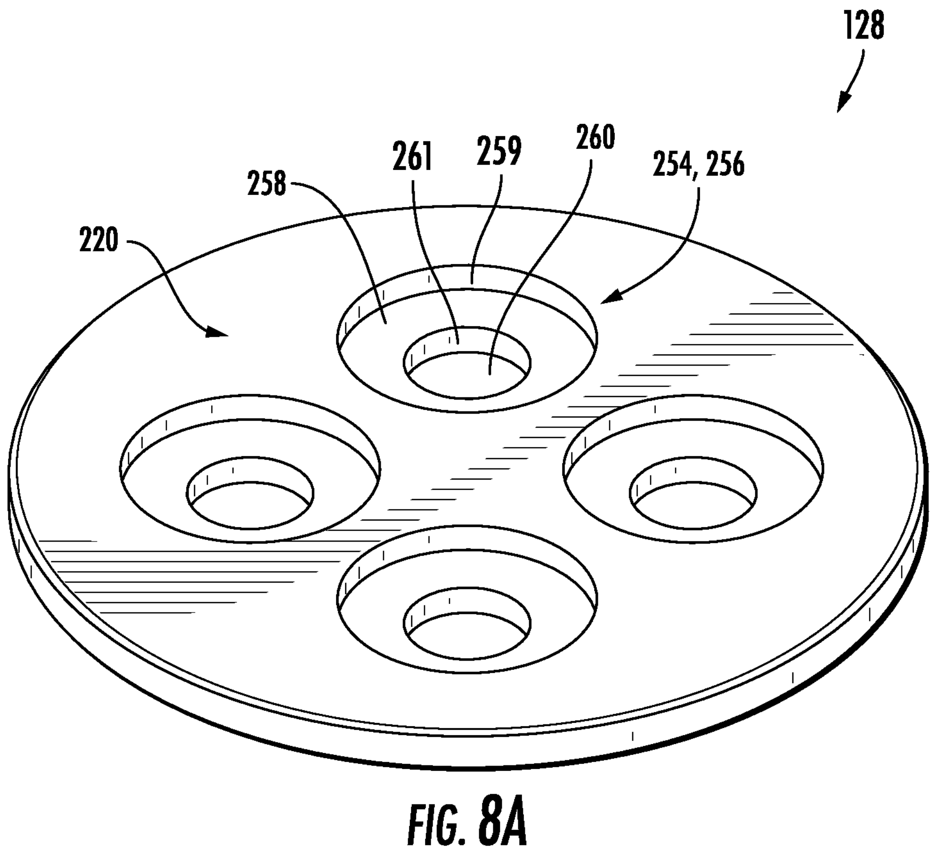
FIGS. 8*a*-8*b* illustrate various view of an embodiment of a sensor cover of a wearable device, particularly illustrating one more possible embodiment of a configuration for a light blocking portion according to the present disclosure.
Figure 8B:
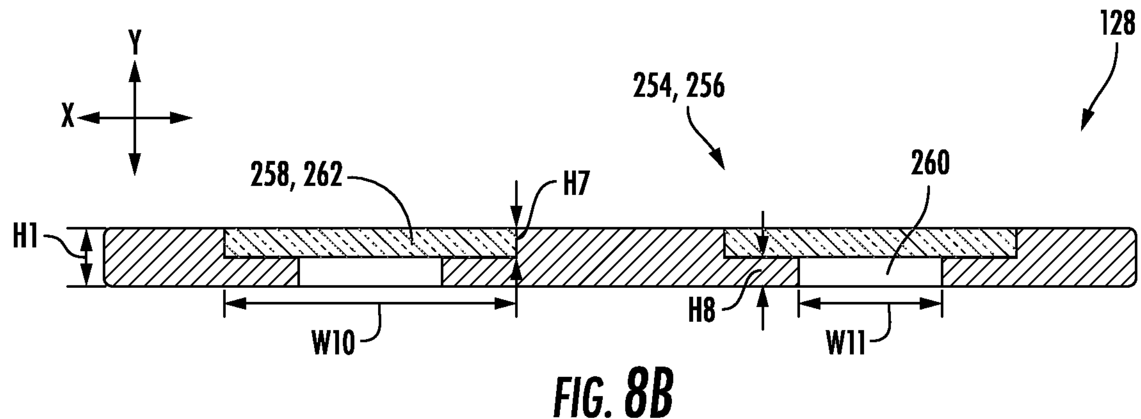

Referring now to FIGS. 8*a*-8*b*, one or more light blocking portions 254 may be defined on the sensor cover 128. Specifically, the light blocking portions 254 may include a counterbore 256 defined on the sensor cover 128. As shown, the counterbore 256 may include a major portion 258 having a wall 259 and a minor portion 260 having a wall 261. Within the major portion 258, a translucent or transparent material 262 may be disposed such that a light allowing region 220 is formed. For example, the material 262 may be a glass or other material that allows the passthrough of light. Further, the material 262 may have the same or substantially the same refractive index of light as the material of the sensor cover 128. For example, the material 262 may be formed from the same material as the material of the sensor cover 128. By providing a major portion 258 and a minor portion 260 with these features, light may be prevented in an undesired manner. Specifically, when light is travelling outward from the sensor cover 128, light may be prevented from entering the minor portion 260 because the empty space of the minor portion 260 has a different refractive index from the other portions of the sensor cover 128. However, when light is returning to the sensor cover 128, light may pass through the major portion 258 in a desired manner. Further, to enhance the selective light blocking properties, a coating may be applied to the walls 259, 261 similar to the coatings described above with references to FIGS. 6A-6B and 7A-7B. Specifically, a coating of an ink, a foam, an elastomer, a metal, a ceramic, or a plastic may be applied to the walls 259, 261 to prevent the pass through of light when light is travelling outward from the sensor cover 128.

In addition, the major portion 258 and the minor portion 260 may together extend the entire height H1 of the sensor cover 128. The major portion 258 and the minor portion 260 may also extend partially through the height H1 of the sensor cover 128. To further control the selective light blocking properties of the counterbore 256, the major portion 258 may have a defined height H7 and width W10 and the minor portion 260 may have a defined height H8 and width W11. For example, the height H7 of the major portion 258 may range from about 0.1 mm to about 0.8 mm, such as about 0.2 mm to about 0.6 mm, such as about 0.3 mm to about 0.5 mm. The width W10 of the major portion 258 may range from about 1 mm to about 8 mm, such as about 2 mm to about 6.5 mm, such as about 3 mm to about 4.5 mm. Further, the height H8 of the minor portion 260 may range from about 0.1 mm to about 0.8 mm, such as about 0.2 mm to about 0.6 mm, such as about 0.3 mm to about 0.5 mm. The width W11 of the minor portion 260 may range from about 0.5 mm to about 4 mm, such as about 1 mm to about 3.5 mm, such as about 2 mm to about 3 mm. Thus, by providing a counterbore 256 with defined widths W10, W11 or defined heights H7, H8, the selective light blocking properties of the counterbore 256 may be further controlled.

While various embodiments of the present disclosure have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied, alone or in some combination, to one or more of the other embodiments of the disclosure, whether or not such embodiments are described, and whether or not such features are presented as being a part of a described embodiment. Thus, the breadth and scope of the present disclosure should not be limited by any of the above-described exemplary embodiments.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the present disclosure, but instead as merely intended to highlight alternative or additional features that may or may not be utilized in a particular embodiment of the present disclosure. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

All of the features disclosed in this specification (including any accompanying exhibits, claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A wearable device configured to selectively permit an emission and a reception of light, the wearable device comprising:

- a hub board having an interior surface and an exterior surface, wherein the hub board extends longitudinally in an x-direction;
- a sensor connected to the exterior surface of the hub board, the sensor comprising:
  - a light emitter extending from the exterior surface of the hub board; and
  - a light receiver extending from the exterior surface of the hub board;
- a light blocking structure located between the light emitter and the light receiver, the light blocking structure extending transversely from the exterior surface of the hub board in a y-direction; and
- a sensor cover positioned over the sensor and having an interior surface and an exterior surface, the sensor cover comprising a light allowing portion and a light blocking portion, wherein the sensor cover is formed of a transparent material, wherein the light blocking portion is formed via removing material from the sensor cover so as to define an air pocket corresponding to the light blocking portion, the light blocking portion comprising a counterbore having a major portion and a minor portion.

2. The wearable device of claim 1, wherein the light blocking structure comprises an ink, a foam, an elastomer, a polymer, a metal, or a combination thereof.

3. The wearable device of claim 1, wherein the light emitter is a light emitting diode or an infrared laser.

4. The wearable device of claim 1, wherein the light receiver is a photodiode or a phototransistor.

5. The wearable device of claim 1, further comprising a material disposed within the major portion of the counterbore, the material configured to allow light that is returning to the sensor cover to pass through the major portion.

6. The wearable device of claim 1, wherein the minor portion is configured to prevent light that is travelling outward from the sensor cover from passing therethrough.

7. The wearable device of claim 1, further comprising a coating located on one or more walls of the counterbore, wherein the coating is configured to prevent the pass through of light that is travelling outward from the sensor cover.

8. A method of manufacturing a wearable device configured to selectively permit an emission and a reception of light, the method comprising:

placing a hub board having an interior surface and an exterior surface within the wearable device, wherein the hub board extends longitudinally in an x-direction;

connecting a sensor to the exterior surface of the hub board, the sensor comprising:

a light emitter extending from the exterior surface of the hub board; and a light receiver extending from the exterior surface of the hub board;

forming a light blocking structure between the light emitter and the light receiver, the light blocking structure extending transversely from the exterior surface of the hub board in a y-direction; and mounting a sensor cover over the sensor, the sensor cover being formed of a transparent material and having an interior surface and an exterior surface, the sensor cover comprising a light allowing portion and a light blocking portion, wherein the light blocking portion is formed via removing material from the sensor cover so as to define an air pocket corresponding to the light blocking portion, the light blocking portion comprising a counterbore having a major portion and a minor portion.

9. The method of claim 8, wherein the light blocking structure extends from the exterior surface of the hub board to the interior surface of the sensor cover.

10. The method of claim 8, further comprising providing a material within the major portion of the counterbore, the material configured to allow light that is returning to the sensor cover to pass through the major portion.

11. The method of claim 8, wherein the minor portion is configured to prevent light that is travelling outward from the sensor cover from passing therethrough.

12. The method of claim 8, further comprising providing a coating located on one or more walls of the counterbore, wherein the coating is configured to prevent the pass through of light that is travelling outward from the sensor cover.

13. A sensor hub configured to selectively permit an emission and a reception of light, the sensor hub comprising:

a hub board having an interior surface and an exterior surface, wherein the hub board extends longitudinally in an x-direction;

a sensor connected to the exterior surface of the hub board, the sensor comprising:

a light emitter extending from the exterior surface of the hub board and a light receiver extending from the exterior surface of the hub board;

a light blocking structure located between the light emitter and the light receiver, the light blocking structure extending transversely from the exterior surface of the hub board in a y-direction; and a sensor cover positioned over the sensor and having an interior surface and an exterior surface, the sensor cover comprising a light allowing portion and a light blocking portion, wherein the sensor cover is formed of a transparent material, wherein the light blocking portion is formed via removing material from the sensor cover so as to define an air pocket corresponding to the light blocking portion, the light blocking portion comprising a counterbore having a major portion and a minor portion.

14. The sensor hub of claim 13, wherein the sensor comprises a heart rate monitor, an oximeter, a blood pressure monitor, or a combination thereof, wherein the light emitter outputs at least one of an optical light with a wavelength of about 620 to about 750 nanometers or an optical light with a wavelength of about 490 to about 570 nanometers.

15. The sensor hub of claim 13, further comprising a material disposed within the major portion of the counterbore, the material configured to allow light that is returning to the sensor cover to pass through the major portion.

16. The sensor hub of claim 13, wherein the minor portion is configured to prevent light that is travelling outward from the sensor cover from passing therethrough.

17. The sensor hub of claim 13, further comprising a coating located on one or more walls of the counterbore, wherein the coating is configured to prevent the pass through of light that is travelling outward from the sensor cover.

18. The sensor hub of claim 13, wherein the light blocking structure comprises an ink, a foam, an elastomer, a polymer, a metal, or a combination thereof.

19. The sensor hub of claim 13, wherein the light emitter is a light emitting diode or an infrared laser.

20. The sensor hub of claim 13, wherein the light receiver is a photodiode or a phototransistor.

* * * * *